United States Patent [19]

Chung, deceased et al.

[11] Patent Number: 4,495,330
[45] Date of Patent: Jan. 22, 1985

[54] CROSSLINKERS FOR RTV COMPOSITIONS

[75] Inventors: Rack H. Chung, deceased, late of Saratoga County, N.Y.; by Betsy A. Chung, executrix, 12 Appletree Ct., Clifton Park, N.Y. 12065

[73] Assignee: General Electric Company, Waterford, N.Y.

[21] Appl. No.: 497,777

[22] Filed: May 25, 1983

[51] Int. Cl.$^3$ ............................................. C08K 3/10
[52] U.S. Cl. ........................................ 524/783; 524/785; 524/789; 524/859; 524/860; 525/479; 528/18; 528/21; 528/33; 528/34; 528/901
[58] Field of Search ............ 528/901, 33, 34, 18, 528/21; 524/783, 785, 789, 859, 860; 525/479

[56] References Cited

U.S. PATENT DOCUMENTS

| | | | |
|---|---|---|---|
| 4,377,706 | 3/1983 | Hallgren | 528/482 |
| 4,395,526 | 7/1983 | White et al. | 556/18 |
| 4,424,157 | 1/1984 | Chung | 528/21 |

*Primary Examiner*—Melvyn I. Marquis
*Attorney, Agent, or Firm*—Gary L. Loser

[57] ABSTRACT

Stable, substantially acid free, one package organopolysiloxane compositions are provided which have a base polymer, a condensation catalyst, a silane scavenger for hydroxy functional groups having cycloaliphatic enoxy functionality, and a curing accelerator, said compositions being curable upon exposure to atmospheric moisture to translucent and colorless tack-free elastomers.

29 Claims, No Drawings

CROSSLINKERS FOR RTV COMPOSITIONS

BACKGROUND OF THE INVENTION

Recently a shelf-stable, fast-curing, one component, alkoxy-functional room temperature vulcanizable (RTV) composition was disclosed in the patent of White et al., U.S. Pat. No. 4,395,526, and assigned to the same assignee as the present invention. Basically, White et al. disclose that moisture curable polyalkoxy-terminated organopolysiloxane RTV compositions can be made by combining (1) a silanol-terminated polydiorganosiloxane base polymer; (2) a crosslinking silane; (3) an effective amount of certain silane scavengers for chemically combined hydroxy radicals; and, (4) an effective amount of a condensation catalyst. The scavenger, which can be either a separate compound or part of the alkoxy-functional crosslinking agent, has a functionality selected from the group consisting of oximato, carbamato, enoxy, amino, amido, imidato, ureido, isocyanato and thioisocyanato. The disclosure of White et al. is incorporated by reference into the present application.

Other scavenger compositions that can be utilized in the White et al. one component alkoxy-functional RTV composition are disclosed in copending patent application by R. T. Swiger and J. E. Hallgren, Ser. No. 476,000, filed Mar. 17, 1983; J. J. Dziark, Ser. No. 349,695, filed Feb. 17, 1982; G. M. Lucas, Ser. No. 464,443, filed Feb. 7, 1983; Chung et al., Ser. No. 428,038, filed Sept. 29, 1982; Chung, Ser. No. 338,518, filed Jan. 11, 1982; and T. D. Mitchell, Ser. No. 462,949, filed about Feb. 1, 1983. All of the foregoing patent applications are assigned to the same assignee as the present invention and are also incorporated by reference into the instant disclosure. The reader is also referred to Ser. No. 487,778, Chung and Lucas, filed concurrently herewith and assigned to the same assignee as the present invention.

White et al. teach the artisan that a scavenger having the general formula:

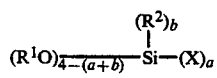

where $R^1$ is an aliphatic organic radical having from 1 to about 8 carbon atoms and which is selected from the group consisting of alkyl radicals, alkylether radicals, alkylester radicals, alkylketone radicals and alkylcyano radicals or an aralkyl radical having 7 to 13 carbon atoms, $R^2$ is a monovalent organic radical having 1 to 13 carbon atoms, and X is a hydrolyzable leaving group selected from the group consisting of amido, amino, carbamato, enoxy, imidato, isocyanato, oximato, thioisocyanato and ureido radicals; when combined with a diorganopolysiloxane base polymer, an effective amount of condensation catalyst and, when the hydrolyzable leaving group is enoxy, a curing accelerator, will provide a one package, stable, moisture curable RTV composition. White et al. teach further that the preferred $R^2$ is selected from the group consisting of methyl, phenyl and vinyl, most preferably is methyl or a mixture of a major amount of methyl and a minor amount of phenyl and/or vinyl, and that the preferred X groups are amido, amino and enoxy, the most preferred being amido.

One shortcoming of a preferred embodiment of White et al., i.e. where $R^2$ is methyl and X is enoxy, is that it produces translucent grades of RTV's that cure yellow in color. For marketing and aesthetic reasons it is highly desirable that the cured RTV composition be colorless.

It is therefore an object of the present invention to provide one package, stable, moisture curable organopolysiloxane compositions which produce translucent and colorless compositions upon curing.

Other objects and advantages of the present invention will be obvious from the following detailed description.

SUMMARY OF THE INVENTION

In accordance with the present invention there is provided a stable, one package RTV composition convertible to a translucent and colorless tack-free elastomer comprising:

(A) a polydiorganosiloxane base polymer wherein the silicon atom at each chain end is terminated with at least two alkoxy radicals;

(B) an effective amount of condensation catalyst;

(C) a stabilizing amount of silane scavenger for hydroxy functional groups having the formula:

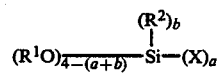

where $R^1$ is a $C_{(1-8)}$ aliphatic organic radical selected from the group consisting of alkyl, alkylether, alkylester, alkylketone and alkylcyano or a $C_{(7-13)}$ aralkyl radical, $R^2$ is a $C_{(1-13)}$ monovalent substituted or unsubstituted hydrocarbon radical, X is a cycloaliphatic enoxy radical, a is a whole number equal to 1 to 4, b is a whole number equal to 0 to 3, and the sum of a+b equals 1 to 4; and (D) an effective amount of curing accelerator selected from the group consisting of substituted guanidines, amines and mixtures thereof.

In another aspect of the present invention the base polymer is silanol endstopped and hence the silane of ingredient (C) is both the silane scavenger for hydroxy functional groups and a polyalkoxy crosslinking agent for terminating the silicon atom at each orgnopolysiloxane chain end with at least two alkoxy radicals, said silane having the formula:

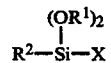

where $R^1$, $R^2$ and X are as previously defined.

DESCRIPTION OF THE INVENTION

In one aspect of the present invention there is provided a stable, one package, substantially anhydrous and substantially acid free, room temperature vulcanizable organopolysiloxane composition stable under ambient conditions in the substantial absence of moisture over an extended period of time and convertible to a translucent and colorless tack-free elastomer comprising:

(A) a polydiorganosiloxane base polymer wherein the silicon atom at each chain end is terminated with at least two alkoxy radicals;

(B) an effective amount of condensation catalyst;

(C) a stabilizing amount of silane scavenger for hydroxy functional groups having the formula:

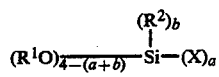

where $R^1$ is a $C_{(1-8)}$ aliphatic organic radical selected from alkyl, alkylether, alkylester, alkylketone and alkylcyano or a $C_{(7-13)}$ aralkyl radical, $R^2$ is a $C_{(1-13)}$ monovalent substituted or unsubstituted hydrocarbon radical, X is a cycloaliphaticenoxy radical; a is a whole number equal to 1 to 4, b is a whole number equal to 0 to 3, and the sum of a+b equals 1 to 4; and (D) an effective amount of curing accelerator selected from the group consisting of substituted guanidines, amines and mixtures thereof.

In another aspect of the present invention the RTV composition which is convertible to a translucent and colorless tack-free elastomer comprises:

(A) a silanol endstopped base polymer;
(B) an effective amount of condensation catalyst;
(C) a silane having the formula:

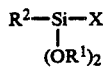

where $R^1$ is a $C_{(1-8)}$ aliphatic organic radical selected from alkyl, alkylether, alkylester, alkylketone and alkylcyano or a $C_{(7-13)}$ aralkyl radical, $R^2$ is a $C_{(1-13)}$ monovalent substituted or unsubstituted hydrocarbon radical, X is a cycloaliphatic enoxy radical, wherein said silane is both the scavenger for hydroxy functional groups and a polyalkoxysilane crosslinking agent for terminating the silicon atom at each organopolysiloxane chain end with at least two alkoxy radicals; and (D) an effective amount of curing accelerator selected from the group consisting of substituted guanidines, amines and mixtures thereof.

The RTV compositions disclosed by White et al. U.S. Pat. No. 4,395,526, are greatly preferred over prior art RTV compositions because they are stable over extended periods of time and are substantially acid-free. One shortcoming of the compositions of White et al. is that some of the preferred embodiments result in translucent RTV compositions that cure to an elastomer which is yellow in color, i.e. when the silane scavenger has the formula:

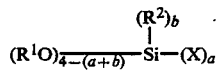

where $R^2$ is methyl or a mixture of a major amount of methyl and a minor amount of phenyl and/or vinyl, and X is enoxy.

The present applicant, however, has surprisingly discovered that by utilizing a silane having cycloaliphatic enoxy functionality as a scavenger for hydroxy functional groups or as a scavenger-crosslinker, not only are the desirable properties disclosed by White et al. obtained, but also the resulting composition is translucent and substantially colorless.

The polydiorganosiloxane base polymer can be either silanol endstopped or alkoxy endstopped, both of which are well known in the art and easily prepared by the skilled artisan. For more detailed information the reader is referred to the White et al. patent and the references cited therein.

With respect to the condensation catalyst, such catalysts are also well known in the art and a rather exhaustive list is provided in the disclosure of White et al. It should be noted that tin compounds are the preferred condensation catalysts and most preferable is dibutyltindiacetate.

The present invention resides in the surprising discovery that when a silane scavenger having cycloaliphatic enoxy functionality is employed, the resulting RTV composition cures to a translucent and substantially colorless elastomer.

As mentioned hereinabove, the base polymer can be silanol endstopped or alkoxy endstopped, however, the limitations placed upon the silane scavenger depend upon the functionality of the base polymer. When the base polymer is pre-endcapped with two or more alkoxy groups, the silane functions only as a scavenger. Accordingly, fewer restrictions need be placed on the scavenger which can be described by the general formula:

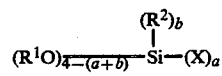 [1]

where $R^1$ is a $C_{(1-8)}$ aliphatic organic radical selected from alkyl, alkylether, alkylester, alkylketone and alkylcyano or a $C_{(7-13)}$ aralkyl radical, $R^2$ is a $C_{(1-13)}$ monovalent substituted or unsubstituted hydrocarbon radical, X is a cycloaliphatic enoxy radical, a is a whole number from 1 to 4, b is a whole number equal to 0 to 3, and the sum of a+b equals 1 to 4.

Alternatively the base polymer can be silanol terminated so that an integrated scavenger-crosslinker can be used which has the formula:

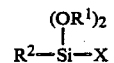 [2]

where $R^1$ is a $C_{(1-8)}$ aliphatic radical selected from the group consisting of alkyl, alkylether, alkylester, alkylketone and alkylcyano or a $C_{(7-13)}$ aralkyl radical, $R^2$ is a $C_{(1-13)}$ monovalent substituted or unsubstituted hydrocarbon radical and X is a cycloaliphatic enoxy radical. In such cases, the resulting polymer has the general formula:

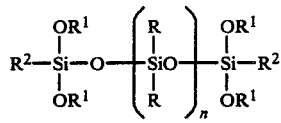 [3]

where R is a $C_{(1-13)}$ monovalent substituted or unsubstituted hydrocarbon radical and $R^1$ and $R^2$ are as previously defined.

Although a methyldialkoxy endcapped base polymer is preferred, a methyldimethoxy endcapped base polymer being particularly preferred, other variations will be obvious to the artisan which will also provide RTV compositions which cure to translucent and substantially colorless elastomers. As an example, where the base polymer is silanol endstopped, rather than employing a scavenger-crosslinker within the scope of formula

[2], it is equally permissible to utilize a scavenger having the general formula:

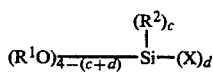

where $R^1$, $R^2$ and X are as previously defined, c is an integer equal to 0 to 3, d is an integer equal to 1 to 4, and the sum of c+d equals 3 or 4; in combination with a crosslinking silane of the formula:

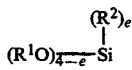

where $R^1$ and $R^2$ are as previously defined and e equals 0 or 1. Of course, such crosslinking silanes can be included in any formulation of the present invention.

In formulas [1], [2] and [3] each of R, $R^1$ and $R^2$ is preferably selected from methyl, ethyl, propyl, vinyl and phenyl and most preferably is methyl. In formulas [1] and [2] the hydrolyzable leaving group X is preferably a cyclic enoxy radical having from 5 to 8 carbon atoms in the ring and most preferably is a cyclic enoxy radical having 5 or 6 carbon atoms in the ring.

Accordingly, some examples of cyclic enoxy silanes within the scope of the present invention are methyldimethoxycyclohexenoxysilane, methyldimethoxycyclopentenoxysilane, methyldimethoxy(3,3,5-trimethyl-1,5-cyclohexadiene-1-oxy) silane, vinyldiethoxycyclohexenoxysilane, phenylethoxymethoxycyclopentenoxysilane, etc.

In addition to the foregoing, scavengers used with polyalkoxy terminated base polymers include trimethylcyclopentenoxysilane, dimethylvinylcyclohexenoxysilane and the like.

Curing accelerators used in the practice of the present invention are selected from the group consisting of substituted guanidines, amines and mixtures thereof. For additional information relating to such compounds the reader is referred to White et al. and U.S. Pat. Nos. 4,180,642 and 4,248,993 to Takago, both of which are incorporated herein by reference.

Various fillers can be incorporated into the composition of the present invention, for example, titanium dioxide, zirconium silicate, silica aerogel, iron oxide, diatomaceous earth, fumed silica, carbon black, precipitated silica, glass fibers, polyvinylchloride, ground quartz and calcium carbonate. The amount of filler utilized can be varied within wide limits in accordance with the intended use. For example, in some sealant applications the curable compositions can be used free of filler whereas in other applications, such as utilizing curable compositions for making binding material, as much as 700 parts or more of filler per 100 parts of organopolysiloxane, on a weight basis, can be employed. Preferably the filler is present in an amount ranging from 10 to 300 parts per 100 parts organopolysiloxane. Additionally, adhesion promoters, sag control agents, plasticizers and the like are included within the scope of the present invention.

EXAMPLES

In order that those skilled in the art might be better able to practice the present invention the following examples are given by way of illustration and not by way of limitation. All parts are by weight unless otherwise noted.

EXAMPLE 1

Methyldimethoxycyclohexenoxysilane was synthesized by adding to a suitable high pressure reactor 98 g. methylchlorodimethoxysilane, 86 g. cyclohexanone, 81 g. triethylamine, 60 g. acetonitrile and 0.7 g. zinc chloride. The reaction mixture was gradually heated to 100° C. and kept for 6 hours. After cooling to room temperature, amine hydrochloride was removed by suction filtration and washed with hexane. Solvents were then removed on a rotary flash evaporator at 40° C. and 100 mm Hg. The crude material was distilled at 61°–63° C./4 mm Hg to yield 81 g. of 95% pure methyldimethoxycyclohexenoxysilane.

The methyldimethoxycyclohexenoxysilane was then compounded with silanol terminated polymer, butylguanidine and dibutyltindiacetate under anhydrous conditions using a Semkit ® mixer in two steps as follows:

| | |
|---|---|
| 100 g. silanol endstopped polymer | First mix 15 min. at room temperature |
| 0.32 g. n-butylguanidine | |
| 3.5 g. methyldimethoxycyclohexenoxysilane | |
| 0.25 g. Bu$_2$Sn(OAc)$_2$ | Second mix 15 min. room temperature |
| 1.0 g trimethyl stopped silicone carrier fluid | |

After mixing the RTV compositions were packed into sealed aluminum tubes and stored 24 hours at room temperature, 33 hours at 100° C. and 72 hours at room temperature. Speed and degree of cure were determined by tack free time (TFT), the results being provided in Table I.

TABLE I

| Initial TFT | 100°/33 hrs. | R.T./72 hrs. |
|---|---|---|
| 10 min. | 40 min. | 15 min. |

The compositions exhibited suitable cured times and the cured compositions were translucent and substantially colorless.

EXAMPLE 2

A more complex cyclo enoxy functional silane, methyldimethoxy (3,3,5-trimethyl-1,5-cyclohexadiene-1-oxy) silane, was prepared by the method described in Example 1 except that the following ingredients were used:

98 g. methylchlorodimethoxysilane
97 g. isophorone
81 g. triethylamine
0.7 g. zinc chloride
60 g. CH$_3$CN The product was distilled at 48°–59°/2 mm Hg. The compounding procedure was also the same as described in Example 1:

| | |
|---|---|
| 100 g. silanol endstopped polymer | First mix 15 min. at room temperature |
| 0.32 n-butylguanidine | |
| 3.5 g. methyldimethoxy (3,3,5-trimethyl 1,5-cyclohexadiene-1-oxy)silane | |
| 0.25 g. Bu$_2$Sn(OAc)$_2$ | Second mix 15 min. at room temperature |
| 0.7 g. silicone carrier fluid | |

The test results are set forth in Table II.

TABLE II

| Initial TFT | 100° C./24 hours | R.T./30 hrs. |
|---|---|---|
| 10 min. | 15 min. | 10 min. |

Again the composition had excellent cure times, and the cured compositions were translucent and substantially colorless, perhaps having a slight yellow tinge.

EXAMPLE 3

This example illustrates one embodiment of the present invention as a hydroxy scavenger in methyldimethoxy terminated polydimethylsiloxane polymer.

Following the compounding procedure of Example 1, formulation was prepared as follows:

| | |
|---|---|
| 100 g. methyldimethoxy endstopped polymer | One step mix 15 min. at room temperature |
| 0.3 g. n-hexylamine | |
| 1.5 g. methyldimethoxycyclohexenoxysilane | |
| 0.25 g. Bu₂Sn(OAc)₂ | |
| 1.0 g. silicone carrier fluid | |

The results are provided in Table III.

TABLE III

| Initial TFT | R.T./24 hrs. | 100° C./24 hr. |
|---|---|---|
| 45 min. | 60 min. | 50 min. |

This example once again shows that RTV compositions having an excellent cure rate are provided by the present invention and which compositions cure to translucent and substantially colorless elastomers.

I claim:

1. A stable, one package, substantially anhydrous and substantially acid-free, room temperature vulcanizable organopolysiloxane composition stable under ambient conditions in the substantial absence of moisture over an extended period of time and convertible to a translucent and colorless tack-free elastomer comprising:
   (A) a polydiorganosiloxane base polymer wherein the silicon atom at each chain end is terminated with at least two alkoxy radicals;
   (B) an effective amount of condensation catalyst;
   (C) a stabilizing amount of silane scavenger for hydroxy functional groups having the formula:

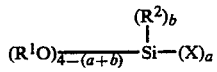

where $R^1$ is a $C_{(1-8)}$ aliphatic organic radical selected from alkyl, alkylether, alkylester, alkylketone and alkylcyano or a $C_{(7-13)}$ aralkyl radical, $R^2$ is a $C_{(1-13)}$ monovalent substituted or unsubstituted hydrocarbon radical, X is a cycloaliphatic enoxy radical, a is a whole number equal to 1 to 4, b is a whole number equal to 0 to 3, and the sum of a+b equals 1 to 4; and
   (D) an effective amount of curing accelerator selected from the group consisting of substituted guanidines, amines and mixtures thereof.

2. The composition of claim 1 further comprising an effective amount of crosslinking silane of the formula:

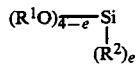

where $R^1$ is a $C_{(1-8)}$ aliphatic organic radical selected from the group consisting of alkyl, alkylether, alkylester, alkylketone and alkylcyano or a $C_{(7-13)}$ aralkyl radical, $R^2$ is a $C_{(1-13)}$ monovalent substituted or unsubstituted hydrocarbon radical and e equals 0 or 1.

3. The composition of claim 1 wherein $R^2$ of the silane scavenger for hydroxy functional groups is selected from the group consisting of methyl, ethyl, propyl, vinyl and phenyl.

4. The composition of claim 1 wherein $R^1$ and $R^2$ of the silane scavenger for hydroxy functional groups is methyl.

5. The composition of claim 1 wherein the cycloaliphatic enoxy radical of the silane scavenger has from 5 to 8 carbon atoms in the ring.

6. The composition of claim 1 wherein the cycloaliphatic enoxy radical of the silane scavenger has 5 or 6 carbon atoms in the ring.

7. The composition of claim 1 wherein the silane scavenger is selected from the group consisting of methyldimethoxycyclohexenoxysilane, methyldimethoxycyclopentenoxysilane and methyldimethoxy (3,3,5-trimethyl-1,5-cyclohexadiene-1-oxy)silane.

8. The composition of claim 1 further comprising up to about 700 parts by weight filler.

9. The composition of claim 8 wherein the filler is selected from the group consisting of titanium dioxide, zirconium silicate, silica aerogel, iron oxide, diatomaceous earth, fumed silica, carbon black, precipitated silica, glass fibers, polyvinylchloride, ground quartz and calcium carbonate.

10. The composition of claim 1 further comprising an effective amount of adhesion promoter.

11. The composition of claim 1 further comprising an effective amount of sag control agent.

12. The composition of claim 1 further comprising an effective amount of plasticizer.

13. The composition of claim 1 wherein the condensation catalyst is a tin compound.

14. The composition of claim 13 wherein the tin compound is dibutyltindiacetate.

15. A method for making a one package, substantially anhydrous and substantially acid-free room temperature vulcanizable composition curable to the solid elastomeric state, which method comprises agitating under substantially anhydrous conditions at a temperature in the range of from 0° C. to 180° C., a room temperature vulcanizable material selected from:
(i) a mixture comprising:
   (a) 100 parts of a silanol terminated polydiorganosiloxane consisting essentially of chemically combined units of the formula

(b) an effective amount of a condensation catalyst,
   (c) a stabilizing amount of a silane scavenger for hydroxy functional groups of the formula

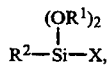

(d) 0–10 parts of a crosslinking silane of the formula

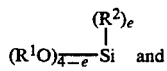

(e) 0.1–5 parts of a curing accelerator selected from the group consisting of substituted guanidines, amines and mixtures thereof; and (ii) a mixture comprising:
(a) 100 parts of a polydiorganosiloxane base polymer wherein the silicon atom at each chain end is terminated with at least two alkoxy radicals;
(b) an effective amount of a condensation catalyst;
(c) a stabilizing amount of a silane scavenger for hydroxy functional groups having the formula

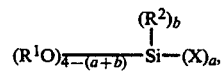

(d) 0–10 parts of a crosslinking silane of the formula

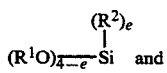

(e) 0.1–5 parts of a curing accelerator selected from the group consisting of substituted guanidines, amines and mixtures thereof;

where R is selected from $C_{(1-13)}$ monovalent substituted or unsubstituted hydrocarbon radicals, $R^1$ is a $C_{(1-8)}$ aliphatic organic radical selected from the group consisting of alkyl, alkylether, alkylester, alkylketone and alkylcyano, or a $C_{(7-13)}$ aralky radical, $R^2$ is a $C_{(1-13)}$ monovalent substituted or unsubstituted hydrocarbon radical, X is a cycloaliphatic enoxy radical, a is a whole number equal to 1 to 4, b is a whole number equal to 0 to 3, the sum of a+b equals 1 to 4, and e equals 0 or 1.

16. The method of claim 15 wherein the condensation catalyst is a tin compound.

17. The method of claim 16 wherein the tin compound is dibutyltindiacetate.

18. The method of claim 15 wherein $R^2$ of the silane scavenger for hydroxy functional groups is selected from the group consisting of methyl, ethyl, propyl, vinyl and phenyl.

19. The method of claim 15 wherein $R^1$ and $R^2$ of the silane scavenger for hydroxy functional groups is methyl.

20. The method of claim 15 wherein the cycloaliphatic enoxy radical of the silane scavenger has from 5 to 8 carbon atoms in the ring.

21. The method of claim 15 wherein the cycloaliphatic enoxy radical of the silane scavenger has 5 or 6 carbon atoms in the ring.

22. The method of claim 15 wherein the silane scavenger is selected from the group consisting of methyldimethoxycyclopentenoxysilane, and methyldimethoxy (3,3,5-trimethyl-1,5-cyclohexadiene-1-oxy) silane.

23. The method of claim 15 further comprising up to about 700 parts by weight filler.

24. The method of claim 23 wherein the filler is selected from the group consisting of titanium dioxide, zirconium silicate, silica aerogel, iron oxide, diatomaceous earth, fumed silica, carbon black, precipitated silica, glass fibers, polyvinyl chloride, ground quartz, and calcium carbonate.

25. The method of claim 15 further comprising an effective amount of adhesion promoter.

26. The method of claim 15 further comprising an effective amount of sag control agent.

27. The method of claim 15 further comprising an effective amount of plasticizer.

28. A stable, one package, substantially anhydrous and substantially acid-free, room temperature vulcanizable organopolysiloxane composition stable under ambient conditions in the substantial absence of moisture over an extended period of time and convertible to a translucent and colorless tack-free elastomer, comprising:
(A) a silanol endstopped polydiorganosiloxane base polymer;
(B) an effective amount of condensation catalyst;
(C) a stabilizing amount of silane scavenger for hydroxy functional groups having the formula

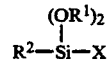

where $R^1$ is a $C_{(1-8)}$ aliphatic organic radical selected from the group consisting of alkyl, alkylether, alkylester, alkylketone and alkylcyano or a $C_{(7-13)}$ aralkyl radical, $R^2$ is a $C_{(1-13)}$ monovalent substituted or unsubstituted hydrocarbon radical, X is a cycloaliphatic enoxy radical, and the silane is both the scavenger for hydroxy functional groups and a polyalkoxysilane crosslinking agent for terminating the silicon atom at each polydiorganosiloxane chain end with at least two alkoxy radicals.

29. The composition of claim 28, further comprising an effective amount of a crosslinking silane of the formula:

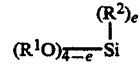

where $R^1$ is a $C_{(1-8)}$ aliphatic organic radical selected from the group consisting of alkyl, alkylether, alkylester, alkylketone and alkylcyano or a $C_{(7-13)}$ aralkyl radical, $R^2$ is a $C_{(1-13)}$ monovalent substituted or unsubstituted hydrocarbon radical, and e equals 0 or 1.

* * * * *